US008678295B2

(12) United States Patent
Liu

(10) Patent No.: US 8,678,295 B2
(45) Date of Patent: Mar. 25, 2014

(54) MINIATURIZED RADIO-FREQUENCY IDENTIFICATION TAG AND MICROSTRIP PATCH ANTENNA THEREOF

(75) Inventor: Zhijia Liu, Shanghai (CN)

(73) Assignees: Shanghai Yaochuan Information Technology Co., Ltd., Shanghai (CN); Xerafy Ltd. (BVI), Tortola (VG)

( * ) Notice: Subject to any disclaimer, the term of this patent is extended or adjusted under 35 U.S.C. 154(b) by 0 days.

(21) Appl. No.: 13/574,360

(22) PCT Filed: Apr. 2, 2010

(86) PCT No.: PCT/CN2010/000429
§ 371 (c)(1), (2), (4) Date: Jul. 20, 2012

(87) PCT Pub. No.: WO2011/088597
PCT Pub. Date: Jul. 28, 2011

(65) Prior Publication Data

US 2013/0043316 A1 Feb. 21, 2013

(30) Foreign Application Priority Data

Jan. 20, 2010 (CN) .......................... 2010 1 0023038

(51) Int. Cl.
*G06K 19/06* (2006.01)
*G06K 19/00* (2006.01)
*H01Q 1/36* (2006.01)
*H01Q 1/38* (2006.01)

(52) U.S. Cl.
USPC ............................ 235/492; 235/487; 343/700

(58) Field of Classification Search
USPC ............. 235/492; 340/572.7, 572.8; 343/700, 343/850, 853; 73/761, 849
See application file for complete search history.

(56) References Cited

U.S. PATENT DOCUMENTS 6,184,841 B1 * 2/2001 Shober et al. ................ 343/853
7,412,898 B1 * 8/2008 Smith et al. ..................... 73/761
7,696,885 B2 * 4/2010 Tuttle ......................... 340/572.7
7,750,813 B2 7/2010 Deavours et al.
2005/0275539 A1 * 12/2005 Sakama et al. ............. 340/572.7
2007/0164868 A1 * 7/2007 Deavours et al. .......... 340/572.7
2007/0275787 A1 * 11/2007 Bouchard et al. ............. 473/125
2010/0109874 A1 5/2010 Yamagajo et al.

FOREIGN PATENT DOCUMENTS

| | | | |
|---|---|---|---|
| CN | 1901281 | A | 1/2007 |
| CN | 101385202 | A1 | 3/2009 |
| CN | 201374076 | Y | 12/2009 |
| WO | 2009/0197358 | | 2/2009 |

* cited by examiner

*Primary Examiner* — Thien M Le
*Assistant Examiner* — Claude J Brown
(74) *Attorney, Agent, or Firm* — Baker & Hostetler LLP

(57) ABSTRACT

A miniaturized Radio Frequency Identification (RFID) tag and a microstrip patch antenna thereof are provided. The miniaturized RFID tag includes: a chip, substrate and a microstrip patch antenna. The microstrip patch antenna is attached to a surface of the substrate and includes a power supply part and a radiation part connected with each other. The power supply part is connected with the chip through a microstrip line. Two sides of the radiation part are provided with at least one slit which has the length of one-half wavelength and enables the tag product to be used normally within a range of shorter than one-half normal wavelength. A maximum point and a minimum point are generated in the radiation part simultaneously, so the tag can be used normally without influencing the performance, even when the tag is in contact with any metal surface. The tag can be miniaturized at the same time.

20 Claims, 4 Drawing Sheets

MINIATURIZED RADIO-FREQUENCY IDENTIFICATION TAG AND MICROSTRIP PATCH ANTENNA THEREOF

CROSS-REFERENCE TO RELATED APPLICATION

This application claims foreign priority to and is a National Stage Application of International Application No. PCT/CN2010/000429, entitled, "MINIATURIZED RADIO-FREQUENCY IDENTIFICATION TAG AND MICROSTRIP PATCH ANTENNA THEREOF," filed Apr. 2, 2010, which claims priority to Chinese Application No. 201010023038.2, entitled, "MINIATURIZED RADIO-FREQUENCY IDENTIFICATION TAG AND MICROSTRIP PATCH ANTENNA THEREOF," filed Jan. 20, 2010, which are both hereby incorporated by reference in their entirety.

FIELD OF THE INVENTION

The present invention relates to a miniaturized radio frequency identification tag (RFIT) and an antenna thereof, and more specifically to an RFIT and an h antenna thereof that can be used on metal surface.

BACKGROUND OF THE INVENTION

Radio Frequency Identification, which is a non-contact automatic identification technology, identifies target objects and obtains related data automatically through RF signals, featuring that the identification can be conducted in various harsh environments without the necessity of manual intervention. The RFID is a wireless system which comprises an interrogator (or a Reader) and many transponders (or Tags). When the antenna used on the tag is attached to the surface of metal materials, the identification rate of common tags is unstable at different positions. Furthermore, different metal environments have to be taken into consideration.

What is different from the Reader of the passive radio frequency identification is that the RFIT is used by attaching it to objects of various materials and in different shapes, so the use of the existing RFIT has limit of use in a metal environment, while the characteristic of stable identification is often the basic design requirement of the tag antenna.

In the radio frequency identification technology, to maximize the function of the reading range, the proper design of the RFIT antenna is especially important. Therefore, the transmission of maximum electric power to the tag chip without loss is required, to the fullest extent possible. For this purpose, the RFIT antenna shall be well matched with the tag chip while having good radiation characteristic. Usually, the RFIT chip has the function of recording various information and reading the information saved.

When the RFIT antenna is attached to a metal body, the return loss and radiation pattern characteristics of the antenna are sensitively affected. Therefore, attention shall be paid to this fact in the antenna design. Generally, a dipole antenna brought near a metal body cannot radiate electromagnetic waves, while, according to the reflected wave on the metal surface, the electric power required by the driving of RFIT chip cannot be ensured. In addition, as the components of the parasitic capacitance between the metal surface and the antenna change, the characteristics, such as the resonance frequency, antenna, impedance and radiation efficiency, will also change.

Therefore, as for the existing identification tag used before, the tag antenna is made by inserting various materials between the metal body and the tag antenna to keep a certain spacing between the radio frequency identification tag and the metal. However, the application of tag antennas made in this way in practical commonly-used products brings some inconvenience. In different environments, such as different metal bodies and different shapes, there are different requirements for such tag antennas, which is not advantageous for mass production. Furthermore, the use environments may cause damage to tags, especially when increasing of the thickness and size, which is not advantageous for miniaturization.

Therefore, an antenna using a metal body as its ground shall be considered to be a metal-body-attaching tag antenna.

The well-known typical antennae of such category are just microstrip patch antennae and planar inverted-F antennae (PIFA).

Usually, although the manufacturing of the microstrip patch antenna is relatively easy, the tag antenna made seems a little bigger due to the half-wave design on resonant frequency, which becomes the disadvantage. Compared to the microstrip patch antenna, the quarter-wave design of the PIFA antenna on resonant frequency makes miniaturization possible, but the consequent problem is that manufacturing becomes complex. Furthermore, when the antenna is attached to a metal body, the resonance characteristic will have some changes as materials and shapes of metal surfaces vary.

In view of this, provision of an RFIT and an antenna thereof to solve the problem above has become a technical problem in need of urgent solution in the field.

BRIEF SUMMARY OF THE INVENTION

To solve the problem above, the aim of the present invention is to provide a miniaturized RFIT antenna, wherein when the miniaturized RFIT of the microstrip patch antenna using a metal body as the ground of the antenna is attached to the metal body, the performance of the antenna will not be lowered, the identification rates in different positions will be stable, and an RFIT making use of the said antenna.

Furthermore, the aim of the present invention is to provide a miniaturized RFIT antenna, wherein the power supply part is designed to be microstrip and connected directly with a radiation part; for the connection with the radio frequency chip, the position of the power supply part is design to be in any position, the top, bottom or side of the dielectric medium, where connection can be conducted easily, and an RFIT making used of the said antenna.

Moreover, the aim of the present invention is to provide a microminiaturized RFIT antenna, wherein under the situation that the attachment space of the RFIT is very narrow, the radiation part, having a "spread-eagle" slit, can make the electrical half-wave length of the radio frequency identification frequency band designed to be the same length, even in an area that less than the normal $\lambda/2$ resonant length, and an RFIT making use of the said antenna.

Furthermore, the aim of the present invention is to provide a microminiaturized metal-attaching type RFIT antenna, wherein the manufacturing process of the antenna is comparatively simple, manufacturing cost is relatively low and various frequency bands can be produced with simple methods, and an RFIT making use of the said antenna.

The aim of the present invention is also to provide a miniaturized RFIT antenna, wherein the substrate is designed to be a ceramic with inherent current in order to realize the microminiaturized RFIT antenna, and an RFIT making use of the said antenna.

Based on the aims above, the present invention provides a microstrip patch antenna in the miniaturized RFIT, including a power supply part and a radiation part connected with each other, wherein the two sides of the radiation part are provided with at least one slit.

Wherein the RFIT also includes a chip, at least, which is connected with the power supply part through a microstrip line.

In the embodiments, the slit can be circular, oval or polygonal. The size of the slit is adjustable. There is spacing between the two sides of the power supply part and the radiation part. The radiation part can be circular, oval or polygonal.

In addition, the microstrip patch antenna in the miniaturized RFIT also includes a metal ground, wherein the metal ground, radiation part and power supply part above are made of silver.

A miniaturized RFIT provided comprises: a chip, a substrate and a microstrip patch antenna, wherein the microstrip patch antenna and the ground are attached to the surface of the substrate; the microstrip patch antenna comprises a power supply part and a radiation part connected with each other; the power supply part is connected with the chip through a microstrip line.

In the embodiments, around the chip, a protective coating, which can be ceramic, rubber or other material, is provided according to the height of the chip. The substrate is ceramic. The microstrip patch antenna also comprises a ground with a connection part, wherein the power supply part and the radiation part are set on the surface opposite to the ground, and the power supply part and the connection part connect the chip on the same surface as the microstrip patch antenna or the ground to be, or a side surface where the microstrip patch antenna is connected to the ground. There is spacing between the two sides of the power supply part and the radiation part. The radiation part can be circular, oval or polygonal. The microstrip patch antenna and ground are made of silver.

The two sides of the radiation part have at least one slit which can be circular, oval or polygonal. The size of the slit is adjustable.

According to the miniaturized RFIT antenna based on the present invention above, the length and width based on the radiation part or bottom surface, the length and width of the slit formed on the radiation part, have the advantage of easy impedance matching with the matching of the ideal resonant frequency and various tag chips as the purpose; furthermore, on the power supply mode, micropstrips are used so that the power supply part can be set in any position, the top, bottom or side face, according to the application environment; furthermore, the embedded chip is not "protruding", so that it is not easily damaged by the external environment. Due to these advantages, the antenna can be formed in a simple Print form, thus realizing such advantages as mass production, low production cost and use in the miniaturized metal-attaching application field.

The miniaturized RFIT antenna based on the present invention, as the tag product attached to metals, of which the performance will not be lowered and identification rate will keep stable even attached to metals of various forms; due to simple production method, various forms can be realized, so that the antenna has the advantage of being easily applicable to wide application fields.

DETAILED DESCRIPTION OF THE PREFERRED EMBODIMENTS

Figure 1:
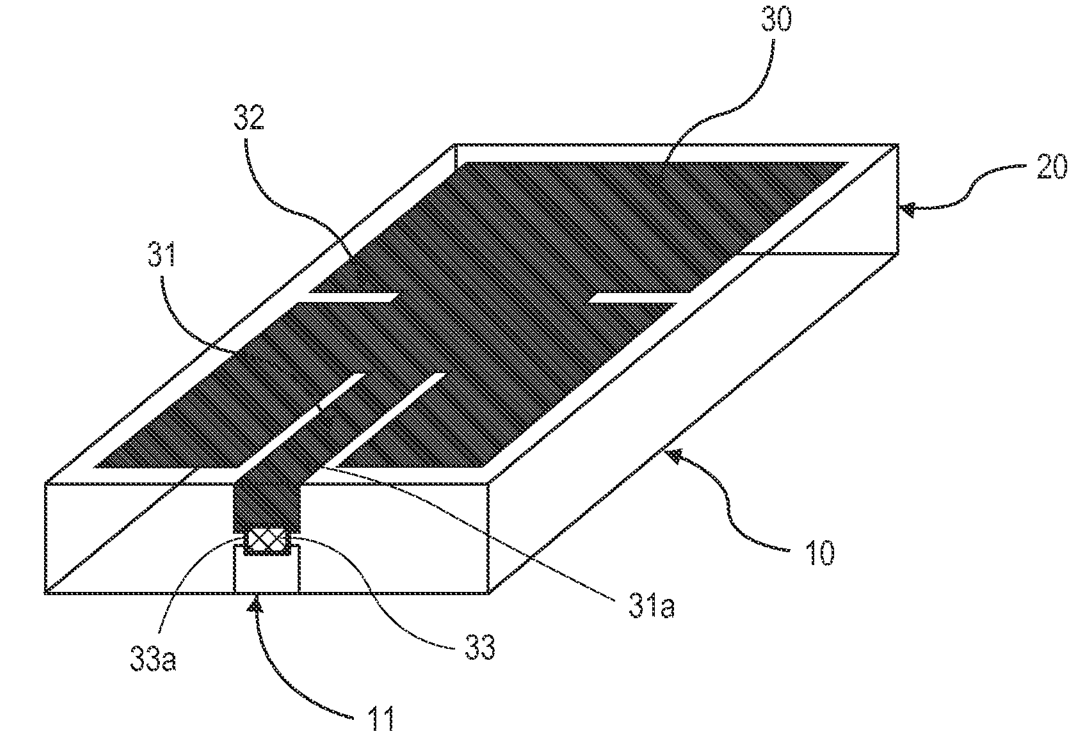
FIG. 1 is a perspective view of the UHF band RFIT antenna that can be attached to metals based on an embodiment of the present invention.

The present invention will be further illustrated hereinafter in conjunction with the specific embodiments. The technicians in the field can easily understand other advantages and functions of the present invention according to the contents disclosed by the description. The present invention can also be implemented or applied through other different embodiments. Various modifications or changes can be made to the details of the description without deviation from the aims of the present invention according to different views and applications.

Radio frequency identification technology is a technology wherein objects are identified by attaching an electric tag onto various objects and identifying the inherent ID of the objects through wireless means. The radio frequency identification system applies to various bands in the range from the 125 kHz frequency band to 5.8 GHz microstrip according to the applicable fields.

Recently, in fields, including logistics circulation field, with the increasing requirements for long-range identification, the operating frequency of the radio frequency system has been increased to be higher than that of ultra-high frequency band. With the increase of the frequency, the design of the RFIT antenna becomes a very important factor in maximizing the reading range of the system performance.

Especially for the passive RFIT antennae which has no extra battery and obtains an operating power supply by rectifying the electromagnetic wave signals output by the reader, the electric power shall be transmitted to the tag chip, with the electric power loss controlled at as maximum a degree as possible. For this purpose, the RFIT antenna shall constitute complete impedance integration with a tag chip accompanied with good radiation characteristics.

The miniaturized RFIT antenna of the present invention, which constitutes complete impedance integration with the tag chip, comprises a power supply part and a radiation part from the overall viewpoint.

The said power supply part obtains an operating power supply by rectifying the electromagnetic waves output by the reader and supplies the operating power supply to the radiation part. The power supply part above is formed by a quadrangle space connecting the RFIT chip.

At this time, the chip of the passive RFIT is set in the said quadrangle space.

The said radiation part and power supply part are connected together through a microstrip line, having an electrical length of about half of the ideal wave length.

The said radiation part finishes the radiation of electromagnetic waves by obtaining the electromagnetic waves output by the reader and obtaining the operating power supply from the said power supply part, having a length of the electrical half-wave of the radio frequency identification frequency band used.

The embodiment of the present invention will be further illustrated hereinafter by referring to the drawings attached. During the illustration of the present invention, to avoid the ambiguousness and unclearness of the aim of the present invention, detailed descriptions related to published functions or the composition will be omitted.

FIG. 1 shows a perspective view of the UHF band RFIT antenna that can be attached to metals based on an embodiment of the present invention. As shown in FIG. 1, the miniaturized RFIT (100) of the present invention comprises: a ground (10), a ceramic substrate (20) on the ground (10), a radiation part (30) on the ceramic substrate (20) and a microstrip power supply part (31) connected with the said radiation part (30). The power supply part (31) is connected to the chip (33) through a microstrip line (31*a*). To supply power to the chip (33) on the side surface, the microstrip power supply part (31) is electrically connected to the side surface with the connection part 11 of the ground 10 in a 90-degree bending shape. Of course, in other embodiments, the chip can also be set on the top or bottom surface of the dielectric medium (20), namely on the same flat surface with the power supply part (31) or the ground (10).

Figure 7A:
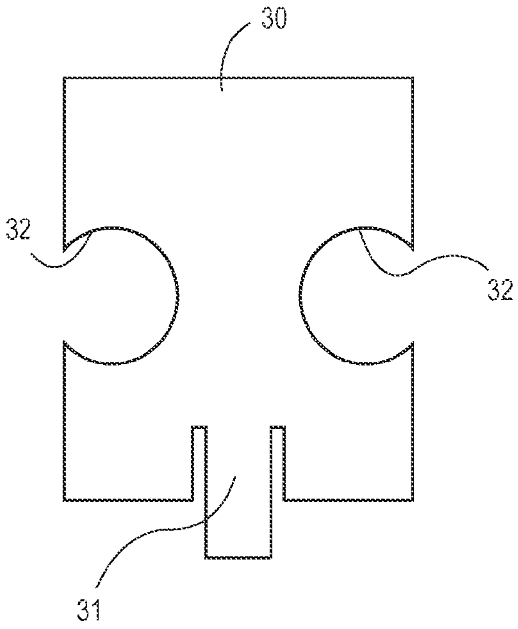
FIGS. 7A, 7B, 7C, and 7D illustrate exemplary shapes of the microstrip patch antenna, according to an embodiment of the invention.
Figure 7B:
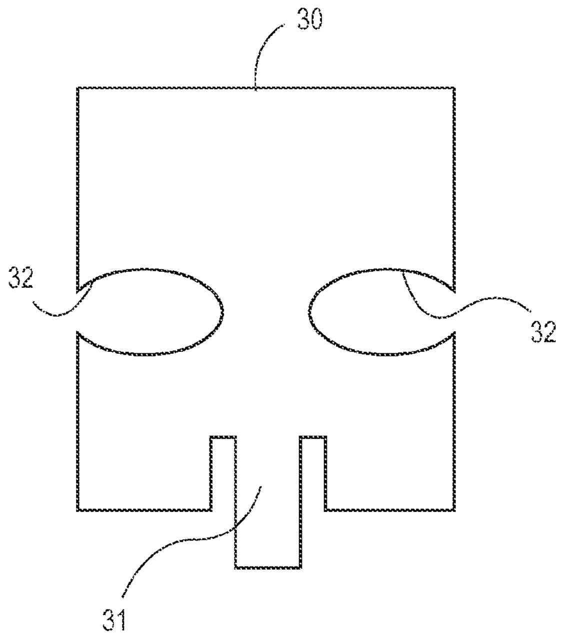
Figure 7C:
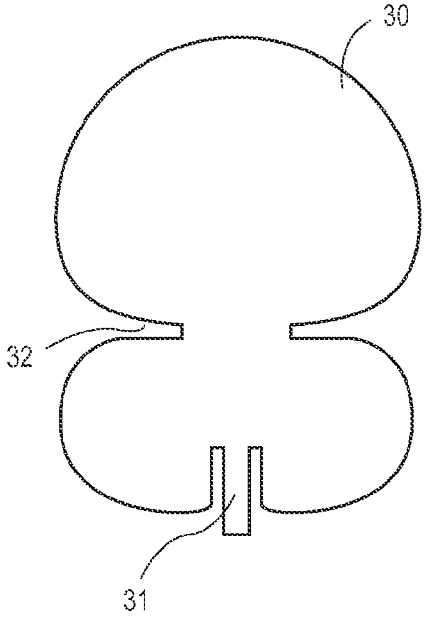
Figure 7D:
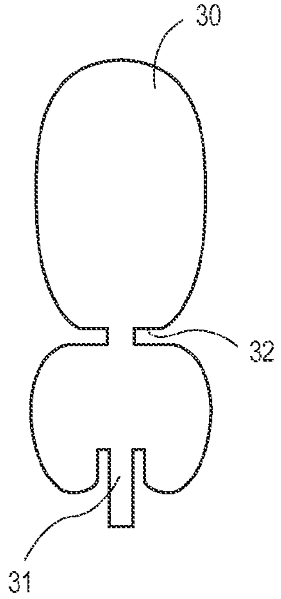

Specifically, the radiation part (30) has a patch antenna of λ/2 resonant length basically, wherein at least one slit (32) is formed on the radiation part (30) and λ/2 resonant length can be kept in spite of its smaller area, thus significantly reducing the size of the miniaturized RFIT (100); the shape of the slit (32) can be varied, such as circles as illustrated in FIG. 7A), ovals (as illustrated in FIG. 7B) and polygons (as illustrated in FIG. 1). Likewise, the shape of the radiation part may be circular (as illustrated in FIG. 7C), oval (as illustrated in FIG. 7D) or polygonal (as illustrated in FIG. 1).

The resonant frequency of the tag antenna (100) can be adjusted by adjusting the width and length of the said slit (32); that is to say, in the use of the tag products, in case of different areas or different standard requirements, the slit can be adjusted and there is no need for replacing the products or the antenna, which is advantageous to mass production of the products; in the embodiment, the length of a slit is one third the width of the radiation part (30) above and the width of a slit does not exceed 0.5 mm. As an ideal embodiment, the miniaturized RFIT (100) produces λ/2 resonance.

Furthermore, on the side surface of the terminal of the microstrip power supply part (31) connected with the radiation part (30), there is a passive radio frequency identification chip, named IC Chip (33).

Figure 2:
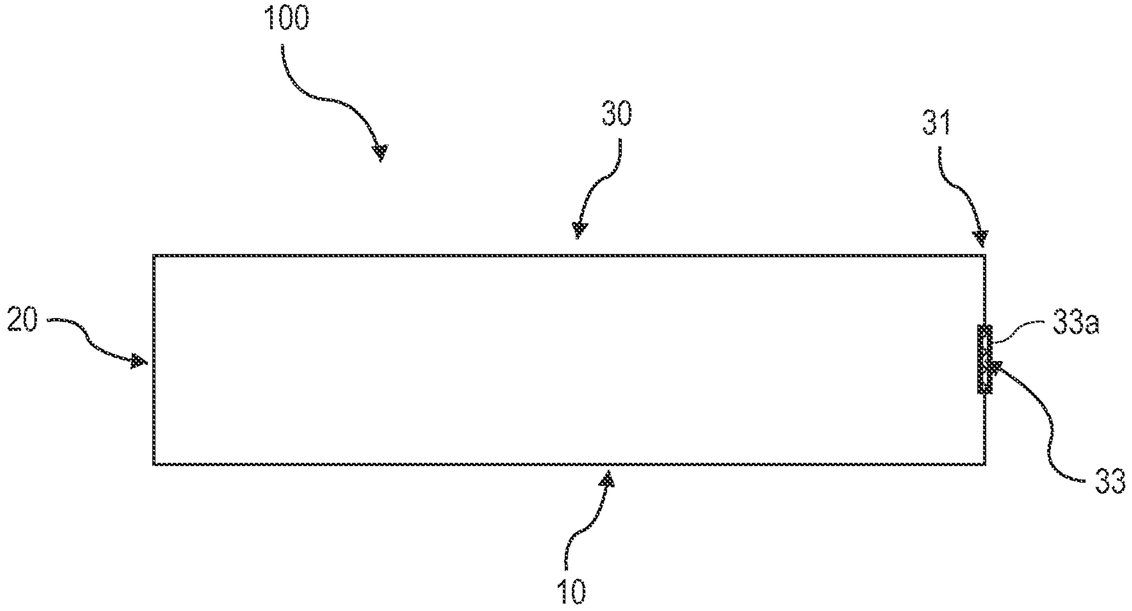
FIG. 2 is a side view of FIG. 1.

FIG. 2 shows a side view of FIG. 1. As shown in FIG. 2, a ground (10), which is one component part of the tag antenna, wherein the top of the ground (10) forms a ceramic dielectric medium (20), the top of the said ceramic dielectric medium (20) forms the radiation part (30) and the microstrip power supply part (31) connected with the said radiation part (30), and the said microstrip power supply part (31) is electrically connected to the side surface in a 90-degree bending shape so as to realize the power supply to the side surface.

Specifically, the said miniaturized RFIT (100) is formed by a microstrip patch antenna making use of λ/2 resonance, wherein a maximum point and a minimum point are generated in the radiation part (30) simultaneously, so the tag can be used without changing the performance of the tag antenna no matter which surface of the metal the miniaturized RFIT (100) is attached to.

The ceramic dielectric medium (20) is formed by ceramic materials with inherent current; while in other embodiments, a protective coating (33*a*) can be set around the said chip (33) according to the height of the chip (33) such as a ceramic layer and rubber layer to protect the chip.

In the meantime, as an ideal embodiment, the overall length of the said miniaturized RFIT (100) is 12~25 mm, the width is 10 mm and the thickness is within 1.5~3 mm, making subminiaturization possible.

Figure 3:
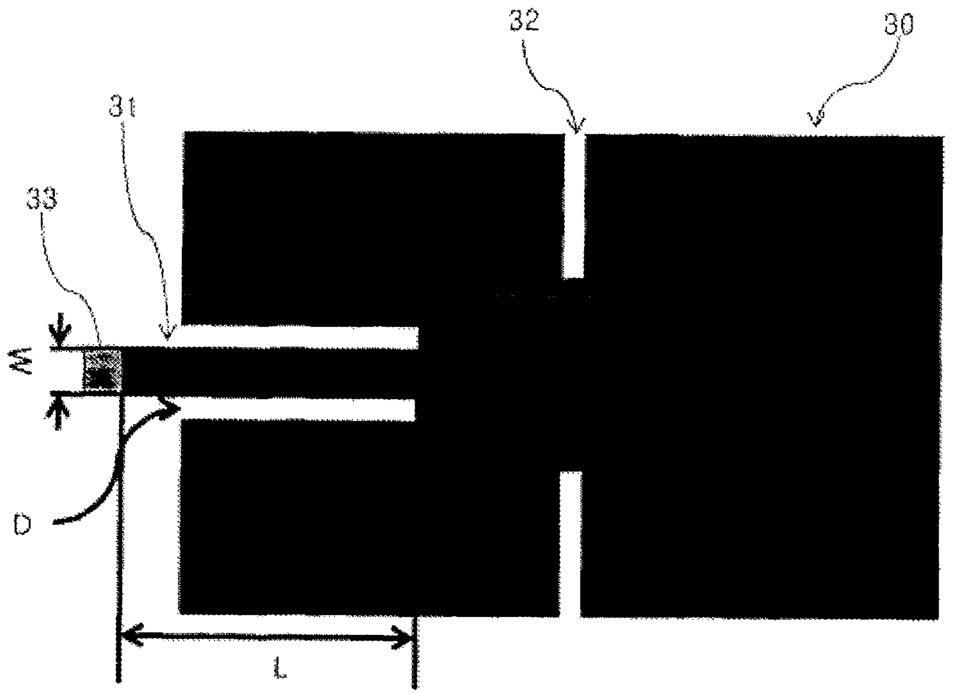
FIG. 3 is a detail of the power supply part and radiation part of the microstrip patch antenna according to the present invention in FIG. 1.

Please refer to FIG. 3, which is a detail of the power supply part and radiation part of the microstrip patch antenna of the present invention. As shown in FIG. 3, in the microstrip patch antenna of the present invention, the said radiation part (30) is connected with the said power supply part (31) of the microstrip; to realize the power supply to the side surface, the power supply part (31) of the said microstrip connects the chip to the side surface in 90-degree bending shape; the chip on the terminal of the microstrip power supply part (31) connected to the said side surface is a passive radio frequency identification IC Chip (33). There is spacing [D] between the two sides of the said power supply part and the said radiation part.

Specifically, the overall size of the miniaturized RFIT (100) which forms slits is of 13 mm×9 mm×3 mm, and in order to obtain high conductivity, the radiation part (30), the power supply part (31) of the microstrip and the ground are made of silver (Ag).

Especially, according to the variations in distance [D] between the length [L], width [W] of the said microstrip power supply part (31) and the radiation part, the imaginary impedance and the real impedance of the miniaturized RFIT (100) can be adjusted.

In the embodiment, while the area of the radiation part is maximized, the length [L], the width [W] and the distance [D] with the radiation part of the microstrip power supply part (31) can be adjusted to be within 10 mm, within 3 mm and within 1 mm, respectively, to realize impedance matching.

Figure 4:
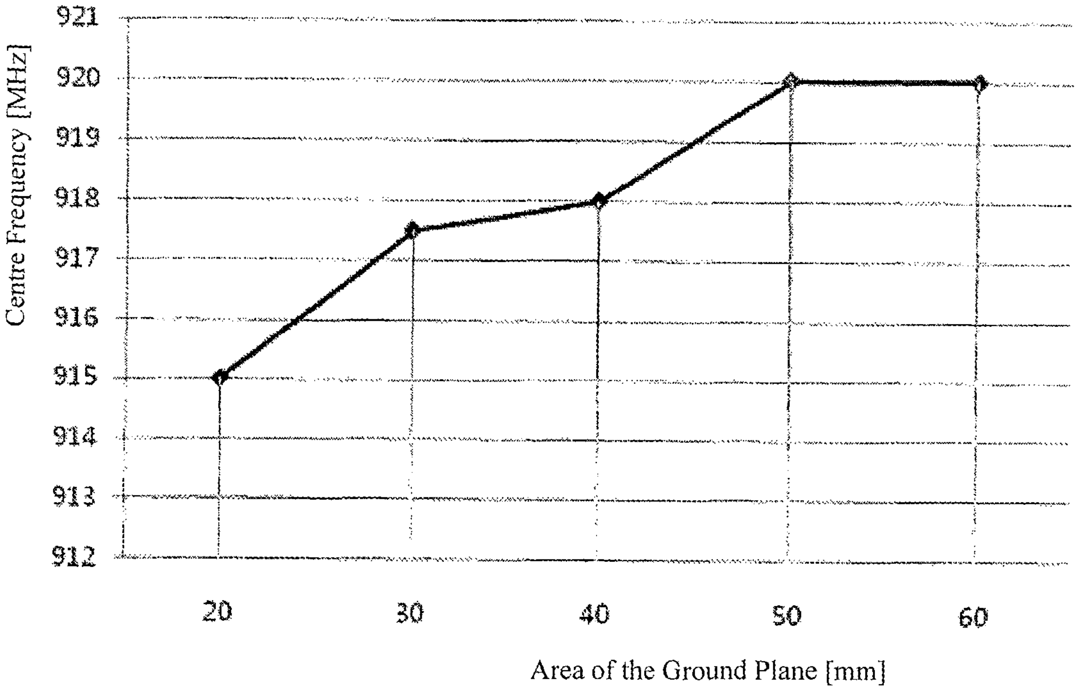
FIG. 4 is a measurement graph of the centre frequency of the present invention based on FIG. 1.

FIG. 4 shows a measurement graph of the centre frequency of the present invention based on FIG. 1. It is the measurement result of the frequency variations according to the size of the metal surface that the miniaturized RFIT (100) attached to.

Specifically, the variations in the size of the miniaturized RFIT (100) attached to the metal surface are provided. According to the size of the material attached to the metal surface, the variation amount of the resonant frequency of the miniaturized RFIT (100) of the present invention is 5 MHz.

Figure 5:
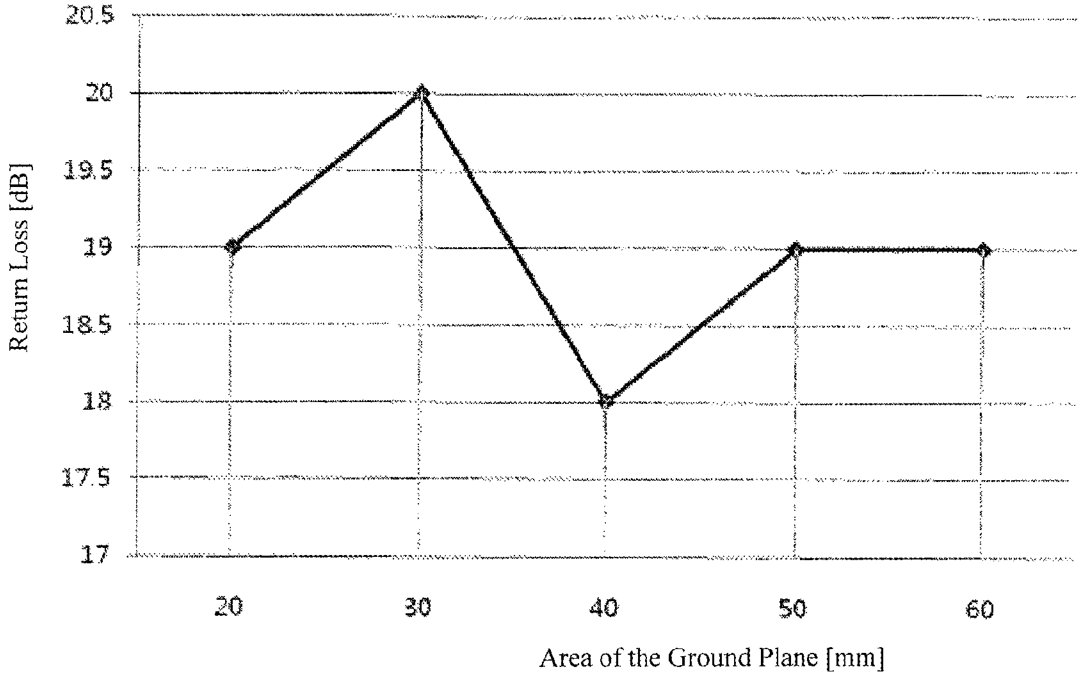
FIG. 5 is a measurement graph of the return loss of the present invention based on FIG. 1.

FIG. 5 shows a measurement graph of the return loss of the present invention based on FIG. 1. It is the measurement result of the return loss variations according to the size of the miniaturized RFIT (100) attached to the metal surface.

Specifically, the variations in the size of the miniaturized RFIT (100) attached to the metal surface are provided. According to the size of the material attached to the metal surface, the maximum variation amount of the return loss of the miniaturized RFIT (100) of the present invention is 2 dB.

It is therefore clear that with regard to the aspect of slow variation of the centre frequency and return loss, there is no relation between the miniaturized RFIT (100) and the size of the material attached to the metal surface.

Figure 6:
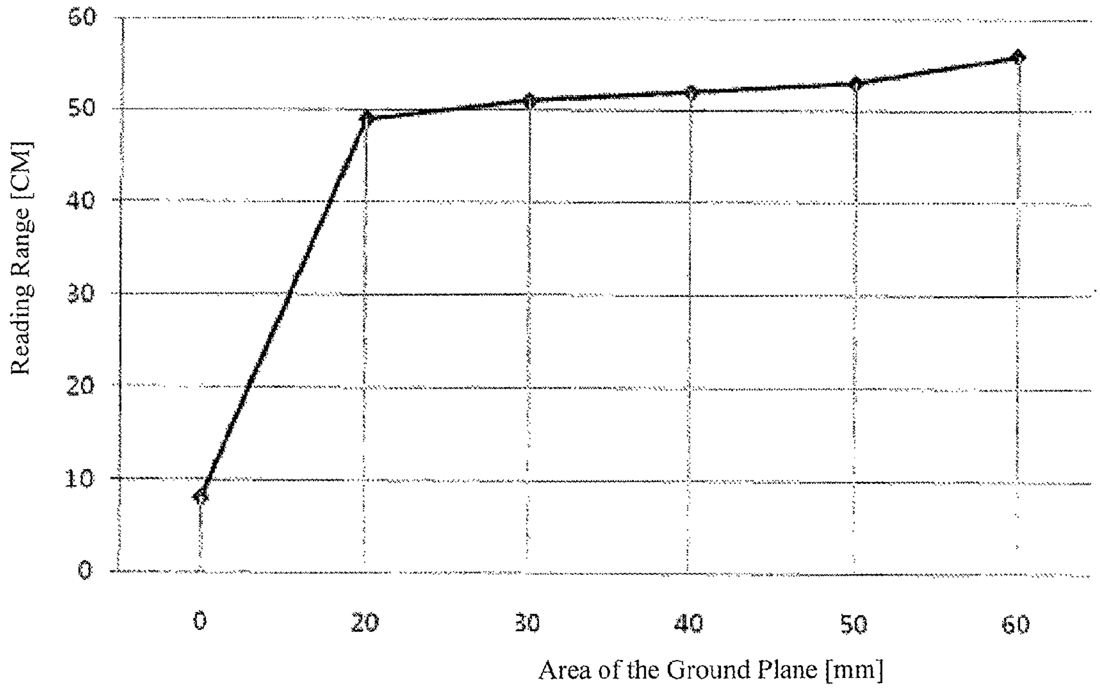
FIG. 6 is a graph of the measurement result of the reading range according to the present invention based on FIG. 1.

FIG. 6 shows a graph of the measurement result of the reading range of the present invention based on FIG. 1, which is the result of the measurement conducted by making use of the handheld reader antenna of a circularly polarized antenna with an output of 28 dBm.

Specifically, the maximum reading range measured when the miniaturized RFIT (100) is not attached to the metal surface is 8 cm, while the size of the metal material attached to the metal is 20×20 mm, the maximum is 49 cm, and the maximum reading range is 56 cm when it is 60×60 mm.

It is therefore clear that when the miniaturized RFIT (100) is attached to metals, the reading range has no relation with the size of the material attached to the metal surface, and there may be no great difference. Therefore, various functions and purposes can be realized in weak metal environments.

As mentioned above, the illustration is given by referring to the miniaturized RFIT and the microstrip patch antenna thereof of the present invention. The detailed description of the drawings and invention above is predictive, so the present invention will not be limited by the embodiments and the drawings.

Those having general knowledge of the technical field have access to know many variants and other similar embodiments can be realized through the present invention. Therefore, the equivalent variation of the composition elements, without surpassing the technical thought or the scope of the field of the present invention provided in the additional Claims, also belongs to the scope of the present invention.

What is claimed is:

1. A microstrip patch antenna applied in a miniaturized radio frequency identification tag (RFIT), comprising:
- a radiation part comprising a first portion and a second portion with at least one slit between the first and the second portions;
- a power supply part formed at an edge of the first portion away from the second portion such that the at least one slit is positioned between the power supply part and the second portion of the radiation part, said at least one slit having at least one continuously curved edge.

2. The microstrip patch antenna applied in the miniaturized RFIT according to claim 1, wherein the at least one slit is circular, oval or polygonal.

3. The microstrip patch antenna applied in the miniaturized RFIT according to claim 1, wherein the radiation part is circular, oval or polygonal.

4. The microstrip patch antenna applied in the miniaturized RFIT according to claim 1, wherein the radiation part and the power supply part are made of silver.

5. The microstrip patch antenna applied in the miniaturized RFIT according to claim 1, wherein a size of the at least one slit is adjustable.

6. The microstrip patch antenna applied in the miniaturized RFIT according to claim 1, wherein the power supply part is directly coupled to the radiation part such that the power supply part is formed from a planar structure having the radiation part and the power supply part.

7. A miniaturized radio frequency identification tag (RFIT), comprising:
- a chip, a substrate and a microstrip patch antenna, wherein the microstrip patch antenna is attached to a surface of the substrate;
- the microstrip patch antenna comprises a power supply part formed at an end of a radiation part, the power supply part; and
- the power supply part is connected with the chip through a microstrip line protruding at least partially beyond the end of the radiation part, said chip being outside the radiation part on a side surface of the substrate perpendicular to a surface of the substrate having the microstrip patch antenna.

8. The miniaturized RFIT according to claim 7, wherein around the chip, a protective coating is provided according to a height of the chip.

9. The miniaturized RFIT according to claim 8, wherein the protective coating is ceramic or rubber.

10. The miniaturized RFIT according to claim 7, wherein the substrate is ceramic.

11. The miniaturized RFIT according to claim 7, wherein the microstrip patch antenna further comprises a ground with a connection part, the power supply part and the radiation part are placed on a surface opposite to the ground, and the power supply part and the connection part connect to the chip on the same surface as the power supply part, the same surface as the ground, or on the side surface where the power supply part is connected to the ground via the connection part.

12. The miniaturized RFIT according to claim 7, wherein the microstrip patch antenna is made of silver.

13. The miniaturized RFIT according to claim 7, wherein there is a space between two sides of the power supply part and the radiation part.

14. The miniaturized RFIT according to claim 7, wherein the radiation part is circular, oval or polygonal.

15. The miniaturized RFIT according to claim 7, wherein two sides of the radiation part are provided with at least one slit between the end having the power supply part and another end of the radiation part.

16. The miniaturized RFIT according to claim 15, wherein the slit is circular, oval or polygonal.

17. The miniaturized RFIT according to claim 16, wherein a size of the slit is adjustable.

18. The miniaturized RFIT according to claim 7, wherein the microstrip line is in a bent configuration to connect the power supply part to the chip.

19. The production method of claim 18 further comprising:
- providing a protective coating according to a height of the chip, around the chip.

20. A production method for a microstrip patch antenna, comprising:
- providing a chip, a substrate and a microstrip patch antenna;
- attaching the microstrip patch antenna to a surface of the substrate; and
- connecting the power supply part is connected with the chip through a microstrip line protruding at least partially beyond the end of the radiation part, said chip being outside the radiation part on a side surface of the substrate perpendicular to a surface of the substrate having the microstrip patch antenna.

* * * * *